United States Patent
Boss et al.

(10) Patent No.: US 6,221,261 B1
(45) Date of Patent: Apr. 24, 2001

(54) PROCESS FOR TREATING SEWAGE USING HYDRO FLUORO ETHER POLYMERS

(76) Inventors: Edward E. Boss, 13700 Veterans Memorial Dr., Suite 380, Houston, TX (US) 77014; Samuel L. Shepherd, 5211 Mulberry Grove, Kingwood, TX (US) 77345

( * ) Notice: Subject to any disclaimer, the term of this patent is extended or adjusted under 35 U.S.C. 154(b) by 0 days.

(21) Appl. No.: 09/458,202

(22) Filed: Dec. 10, 1999

Related U.S. Application Data

(63) Continuation-in-part of application No. 09/092,579, filed on Jun. 5, 1998, now Pat. No. 6,056,880, which is a continuation-in-part of application No. 08/910,849, filed on Aug. 13, 1997, now Pat. No. 5,868,942.

(51) Int. Cl.$^7$ ........................................ C02F 1/72
(52) U.S. Cl. .................. 210/749; 210/750; 210/758; 210/761; 210/765; 210/766; 210/768; 210/774; 210/803; 210/805; 210/806; 210/808
(58) Field of Search ..................... 210/749, 750, 210/758, 761, 765, 766, 767, 768, 774, 790, 800, 803, 805, 806, 808

(56) References Cited

U.S. PATENT DOCUMENTS

| | | |
|---|---|---|
| 5,248,419 | * 9/1993 | Long et al. . |
| 5,567,765 | 10/1996 | Moore et al. . |
| 5,643,454 | * 7/1997 | Garrett et al. . |
| 5,785,950 | 7/1998 | Kaufman et al. . |
| 6,106,716 | * 8/2000 | Boss et al. . |

* cited by examiner

Primary Examiner—David A. Simmons
Assistant Examiner—Betsey Morrison Hoey
(74) Attorney, Agent, or Firm—Harrison & Egbert

(57) ABSTRACT

A process for treating sewage containing biological solids including the steps of mixing the sewage with oxygen-containing hydro fluoro ether polymers, retaining the sewage with the hydro fluoro ether polymers for a desired period of time so as to produce oxygenated sewage and carbon dioxide-containing hydro fluoro ether polymers, and separating the carbon dioxide-containing hydro fluoro ether polymers from the oxygenated sewage. Water is separated from the oxygenated sewage so as to produce a sludge. Oxygen is mixed with the carbon dioxide-containing hydro fluoro ether polymers so as to oxygenate the hydro fluoro ether polymers and to remove carbon dioxide therefrom. The sewage is retained with the hydro fluoro etherpolymers at a temperature of between 32° and 140° F. The sewage is dewatered prior to mixing so that the dewatered sewage has a water content of less than 93 percent by weight. The steps of mixing and retaining can be carried in a closed vessel. The hydro, fluoro ether polymers can be an emulsion containing perfluoro-bis-chlorobutyl ether.

20 Claims, 3 Drawing Sheets

PROCESS FOR TREATING SEWAGE USING HYDRO FLUORO ETHER POLYMERS

RELATED APPLICATIONS

The present application is a continuation-in-part of U.S. patent application Ser. No. 09/092,579, filed on Jun. 5, 1998, and entitled "Process for Treating a Waste Sludge of Biological Solids", now U.S. Pat. No. 6,056,880, issued May 2, 2000. U.S. patent application Ser. No. 09/092,579 was a continuation-in-part of U.S. patent application Ser. No. 08/910,849, filed on Aug. 13, 1997, and entitled "Process for Treating a Waste Sludge of Biological Solids". This patent issued as U.S. Pat. No. 5,868,942 on Feb. 9, 1999 to Boss et al.

TECHNICAL FIELD

The present invention relates to processes for the treatment of waste sludges. More particularly, the present invention relates to processes for the aeration of sewage prior to the treatment of the waste sludge. Additionally, the present invention relates to the use of hydro fluoro ether polymers for the treatment of sewage. Furthermore, the present invention relates to processes that render biological wastes pathogen-free, vector-free and sellable.

BACKGROUND ART

In the past, various techniques have been developed for the purpose of sterilizing or decontaminating biological sludges and wastes. The most common process is the process of mixing lime with the sludge. The reaction of lime with the water in the sludge serves to elevate the temperature of the sludge to a maximum of 100° C.

In the past, various U.S. patents have issued relating to processes for the decontamination and treatment of wastewater sludges. For example, U.S. Pat. No. 4,038,180, issued on Jul. 26, 1977 to N. K. Talbert, describes a process of dewatering sewage sludge in which the sludge from a municipal or industrial sewage treatment facility is mixed with a mineral acid or anhydride thereof to release the entrapped water in the sludge. The resulting mixture of the sludge solids and diluted acid or anhydride is then mixed with a basic material, such as ammonia, such that the heat generated by the reaction of the base and the acid evaporates the water to form either a completely dry mixture of sludge solids and a salt or a mixture having a predetermined moisture content which may be air dried.

U.S. Pat. No. 4,500,428, issued on Feb. 19, 1985 to Lynch et al., describes a method for the treatment of a wastewater sludge using a pair of reaction vessels, sequentially, to treat the sludge. Both of the vessels are pressurized. The first vessel has an aerator for aerating the sludge. This vesl receives sulfuric acid and chlorine therein through a port. A dewatering device is provided upstream of the first vessel. The outlet of the first vessel is coupled to an inlet of the second vessel through another dewatering device. The second vessel creates a final-treatment chamber in which the sludge is exposed to ozone, air and lime.

U.S. Pat. Nos. 4,781,842 and 4,902,431, issued to Nicholson, teach processes for the decontaminating of wastewater sludges to a level which meets or exceeds U.S. E.P.A. process standards. The process mixes sludge with an alkaline material sufficient to raise the pH of the end product to 12 or higher for at least one day. This process will raise the temperature to 50° C., but will not sterilize the sludge nor does it eliminate the pathogenic organisms.

U.S. Pat. No. 4,306,978, issued to Wurtz, relates to a process of lime stabilization of wastewater treatment plant sludge. This patent discloses the dewatering of the sludge and intimately mixing calcium oxide to raise the temperature so as to produce a stabilized sludge particle.

U.S. Pat. No. 5,482,528, issued on Jan. 9, 1996 to Angell et al., teaches a pathogenic waste treatment process for the processing of solid waste and for the converting of such solid waste into useful products. This is accomplished by combining the waste with an acid, such as concentrated sulfuric acid, and a base, such as fly ash. These exothermically react and thermally pasteurize the waste and add mineral value to the product. Pozzolanic materials, such as fly ash, agglomerate the product. The calcium oxide in the fly ash reacts with sulfuric acid to form calcium sulfate dihydrate.

None of these prior art patented processes are capable of achieving temperatures, when mixed with the sludge, of greater than 100° C. None of the prior art techniques allow for the shorter drying times as required by 40 C.F.R. Subchapter O, Part 503.32.

U.S. Pat. No. 5,635,069 issued on Jun. 3, 1997 to the present inventors. This patent described a process for treating a waste sludge of biological solids which included the steps of mixing the sludge with an oxide-containing chemical and sulfamic acid so as to elevate the temperature of the sludge, pressurizing the mixed sludge to a pressure of greater than 14.7 p.s.i.a., and discharging the pressurized mixed sludge. The oxide-containing chemical could be either calcium oxide, potassium oxide, or potassium hydroxide. The sludge has a water content of between 5 and 85 percent. The oxide-containing chemical and the acid are reacted with the sludge so as to elevate the temperature of the sludge to between 50° C. and 450° C. The pressurized mixed sludge is flashed across a restricting orifice or passed into a chamber having a lower pressure. The evaporated liquid component can be condensed and used as part of the process or external of the process.

Typically, there are various problems associated with the treatment of sewage. It is fundamental that the sewage be aerated so that the aerobic microorganisms can be suitably supplied with oxygen such that they can consume the waste. In municipal applications, very large aerator assemblies are provided which continually bubble airthrough the sewage. It is desirable to introduce as much oxygen as possible into the liquid of the sewage. Through bubbling air techniques, a maximum of 9 parts per million of dissolved oxygen can be achieved in the liquid at about 75° F. Frequently, the oxygen content of the liquid will fall to such a level that the process becomes anaerobic. Under such circumstances, a horrible smell will be emitted by the waste processing facility. Since these municipal systems are open to the environment, when the process becomes anaerobic, there will be serious complaints by neighboring residents. Furthermore, these open top municipal treatment systems introduce enormous amounts of carbon dioxide and other hazardous air pollutants into the environment. The aerobic microorganisms consume the waste by converting it into carbon dioxide. Some of this carbon dioxide is emitted into the environment. This can exacerbate the "greenhouse effect".

The metabolic rate of the aerobic microorganisms is only limited by the nutrients (the sewage) and by the oxygen uptake rate. As such, if greater amounts of oxygen could be introduced to the sewage, then the aerobic microorganisms would process the waste with greater rapidity.

The cost for aerating the sewage is enormous. For a five million gallon per day facility, the energy cost for operating the aerators is approximately $80,000 dollars per month. Additionally, there is a relatively large capital cost associated with the installation of such aerating systems. Furthermore, because of the relatively small amount of oxygen that can be mixed into the water of the sewage, the processing facility must take up a considerable area. As a result, sewage is pumped into enormous open top tanks. Ultimately, the processed sewage will be discharged into the environment.

Importantly, there have been significant developments in the creation of artificial blood. Artificial blood is used by the military for emergency use, in place of plasma, in field conditions. This artificial blood is a hydro fluoro ether polymer which contains long carbon chains. Oxygen molecules are connected to these carbon chains by a relatively weak bond. As result, when the artificial blood is passed through the human body, the blood is oxygenated by the substitution of carbon dioxide molecules for the oxygen molecules in the polymer. Since the carbon dioxide is attached to the carbon chains with a weaker bond than the oxygen molecules, the carbon dioxide molecules can be easily removed from the polymer and substituted with oxygen molecules. The carbon dioxide can be removed from the polymer by simply passing oxygen intimately with the polymer. As a result, carbon dioxide will be discharged from the polymer.

This artificial blood, consisting of hydro fluoro ether polymers, is described in U.S. Pat. No. 5,567,765, issued on Oct. 22, 1996 to Moore et al., and in U.S. Pat. No. 5,785,950, issued on Jul. 28, 1998, to Kaufman et al. Each of these patents is owned by Minnesota Mining and Manufacturing Company of St. Paul, Minn. Each of these patents describes highly fluorinated chloro-substituted, non-cyclic organic compounds having 7 to 12 carbon atoms. Importantly, it has been found that this hydro fluoro ether polymers can absorb an excess of 48 percent by weight of oxygen. As such, unlike the 9 parts per million achieved through the use of bubbling air through sewage, hydro fluoro etherpolymers can contain approximately 480,000 parts permillion of oxygen.

It is an object of the present invention to provide a process for treating sewage which maximizes the amount of oxygen available to the aerobic microorganisms.

It is another object of the present invention to provide a process for treating sewage which causes a processing of the sewage as completely and rapidly as possible.

It is a further object of the present invention to provide a process for treating sewage which allows the treatment process to be carried out in a closed container.

It is a further object of the present invention to provide a process for treating sewage which eliminates the need for aerators in the sewage tank.

It is still a further object of the present invention to provide a process for treating sewage which allows for the containment of carbon dioxide and other hazardous air pollutants.

It is still a further object of the present invention to provide a process for treating sewage which minimizes the capital and operating costs associated with the treatment of such sewage.

It is still a further object of the present invention to provide a process which renders the sewage pathogen-free and vector-free.

It is another object of the present invention to provide a process that converts the biological waste sludge into a sellable end product.

It is still a further object of the present invention to provide a process for the treatment of sewage that is cost effective, easy to use and easy to install.

These and other objects and advantages of the present invention will become apparent from a reading of the attached specification and appended claims.

SUMMARY OF THE INVENTION

The present invention is a process for treating sewage containing biological solids including the steps of: (1) mixing the sewage with oxygen-containing hydro fluoro ether polymers; (2) retaining the sewage with the hydro fluoro ether polymers for a desired period of time so as to produce oxygenated sewage and carbon dioxide-containing hydro fluoro ether polymers; and (3) separating the carbon dioxide-containing hydro fluoro ether polymers from the oxygenated sewage. The water is separated from the oxygenated sewage so as to produce a sludge. Oxygen is mixed with the carbon dioxide-containing hydro fluoro ether polymers so as to oxygenate the hydro fluoro ether polymers and to remove carbon dioxide therefrom. The carbon dioxide can be passed to a scrubber so as to separate residual oxygen therefrom. This residual oxygen can be introduced into the hydro fluoro ether polymers so as to oxygenate the hydro fluoro ether polymers.

In the process of the present invention, the sewage is retained with the hydro fluoro ether polymers at a temperature of between 32° and 140° F. The sewage can be dewatered prior to mixing such that the dewatered sludge has a water content of less than 93 percent by weight. The steps of mixing and retaining can be carried out simultaneously in a closed vessel.

The process of the present invention further includes the steps of: (1) blending the sludge with an acid; (2) mixing an oxide-containing chemical with the blended sludge so as to cause a reaction which elevates a temperature of the sludge; (3) pressurizing the mixed sludge to a pressure of greater than 14.7 p.s.i.a for a period of time of no less than 15 seconds; and (4) discharging the pressurized mixed sludge. The sludge will have a solids content of greater than 7 percent. The oxide-containing chemical can be calcium hydroxide, sodium hydroxide, potassium hydroxide, lithium hydroxide, calcium oxide, sodium oxide, potassium oxide or lithium oxide. The mixing of the sludge can be carried as a flow through a pipe. A pipe can be used so as to maintain the mixed sludge at a pressure of greater than 14.7 p.s.i.a. The pipe should have a length and diameter such that the flow of the mixed sludge will take longer than 15 seconds to pass through the pipe. The step of discharging can include the steps of flashing the pressurized mixed sludge across a restricting orifice and evaporating a liquid component of the sludge.

In the preferred embodiment of the present invention, the hydro fluoro ether polymers can be an emulsion including perfluoro-bis-chlorobutyl ether. Alternatively, the hydro fluoro ether polymers can be an aqueous emulsion of a saturated $C_8$ to $C_{12}$ perfluorocarbon ether hydride selected from hydroperfluoroaliphatic ether, hydroperfluoroaliphatic ether substituted with a perfluoroalicyclic group, or a hydroperfluoroalicycloaliphatic ether and mixtures thereof, with water and a surfactant.

DETAILED DESCRIPTION OF THE INVENTION

Figure 1:
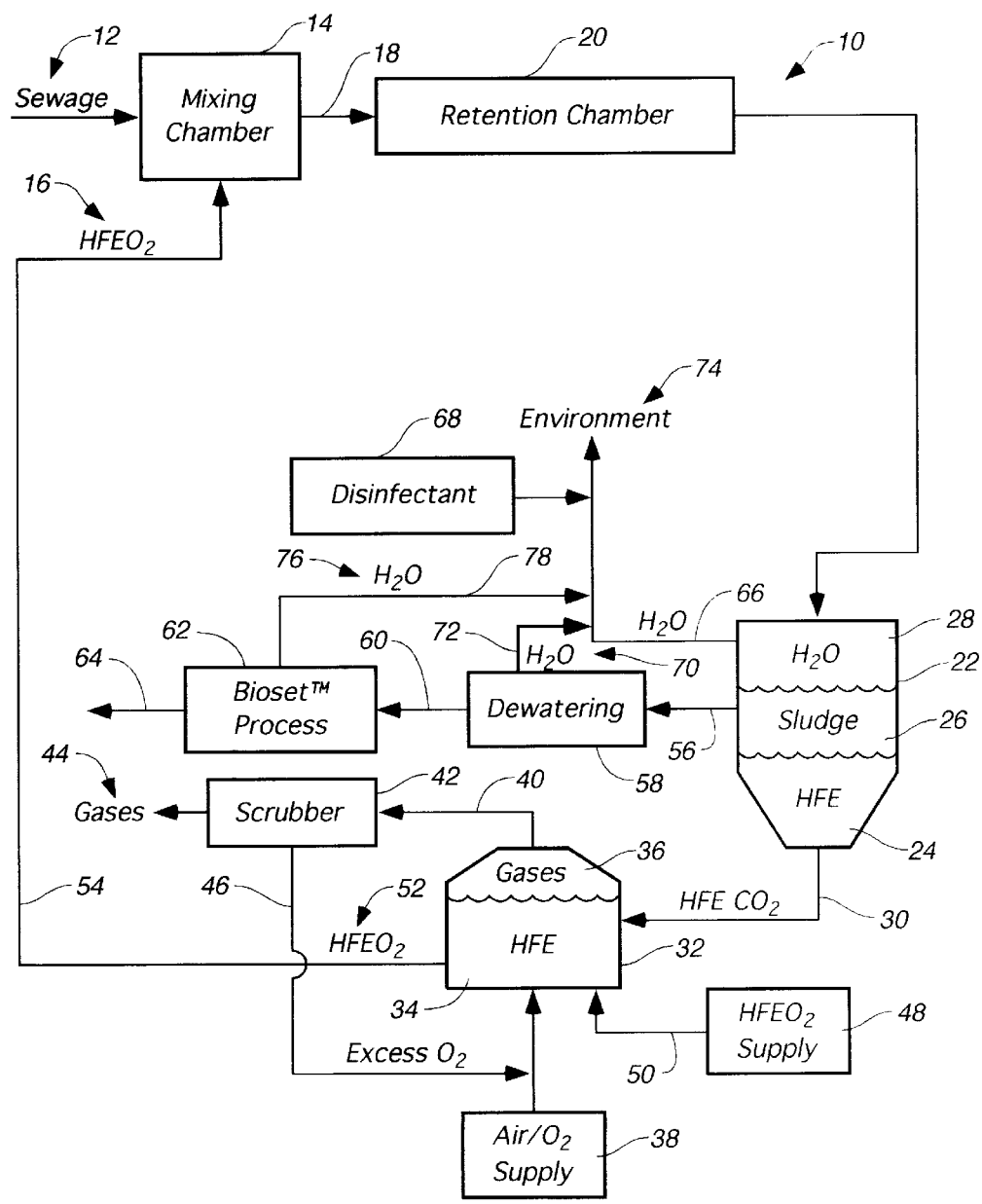
FIG. 1 is a flow diagram showing the process of the present invention.

FIG. 1 is a flow diagram showing the process 10 in accordance with teachings of the preferred embodiment of the present invention. In the process shown in FIG. 1, the sewage 12 is initially introduced into a mixing chamber 14. The sewage 12, being raw sewage, will typically have a solids content of between 0.5 and 3 percent. Oxygenated hydro fluoro ether polymers 16 are also introduced into the mixing chamber 14 so that the oxygenated hydro fluoro ether polymers 16 can be intimately mixed with sewage 12 within the mixing chamber 14. The mixed sewage and hydro fluoro ether polymers are then passed along line 18 to a retention chamber 20. The retention chamber 20 serves to retain the mixture of hydro fluoro ether polymers and sewage in intimate contact for a desired period of time so that the aerobic microorganisms can effectively process the sewage.

As stated previously, the hydro fluoro ether polymers can contain 480,000 parts per million of oxygen. As such, a relatively small amount of the hydro fluoro ether polymers can be used so as to effectively provide oxygen to the microorganisms in the sewage. Relatively large amounts of oxygen turn the microorganisms into a virtual "incinerator" of the waste. Since the hydro fluoro ether polymers contain the oxygen for use by the aerobic microorganisms, the present invention does not require the use of aerators in the mixing chamber 14 or in the retention chamber 20. In fact, the mixing chamber 14 and the retention chamber 20 can be completely sealed to the external environment. The creation of carbon dioxide is effectively retained within such closed or sealed containers. As such, there is no discharge of carbon dioxide or other hazardous air pollutants to the external environment.

In effect, the mixing chamber 14 and the retention chamber 20 can be the same item. For example, it is possible to introduce the sewage 12 and the hydro fluoro ether polymers 16 through a pipe, having a sufficient diameter and length along with static or dynamic mixers, so that the sewage 12 is maintained in intimate contact with the hydro fluoro ether polymers 16 for the desired period of time. The size of the retention chamber 20, if it is a pipe, can be set in accordance with the following formula:

$$\tau = \frac{(\pi r^2 L)\rho}{F}$$

where $\rho$ is the density of the sewage/hydro fluoro ether polymers mixture, F is the pounds per hour of processing, r is the radius of the retention chamber 20, and L is the length of the retention chamber 20. Under certain circumstances, the hydro fluoro ether polymers may be diluted with water or the sewage dewatered. As such, the length of the retention chamber should be properly set relative to the constraints of the system. For example, the retention chamber 20 can be of a shorter length or of a smaller diameter if purer hydro fluoro ether polymers or higher solids content sewage are processed.

As can be seen in FIG. 1, the mixed hydro fluoro ether polymers and sewage are passed from the retention chamber 20 to a settling tank 22. Alternatively, the settling tank 22 could be in the form of a centrifugal separator or other form of separator. As can be seen in FIG. 1, the settling tank 22 allows the mixture to reside therein such that the hydro fluoro ether polymers 24 reside at the bottom of the tank 22. The sludge 26 will reside as a layer above the hydro fluoro ether polymers 24. Water 28 will reside above the sludge 26. In other words, the materials of greater density will settle toward the bottom of the setting tank 22.

The hydro fluoro ether polymers 24 will have released their oxygen and be saturated with carbon dioxide after mixing with the sewage. The oxygen molecules on the polymer chain will be replaced with carbon dioxide. The aerobic microorganisms have absorbed the oxygen molecules from the polymer chains from the hydro fluoro ether polymers 24. As can be seen, the hydro fluoro ether polymers 24 will pass as carbon dioxide-containing hydro fluoro ether polymers along line 30 to an oxygenating chamber 32.

When the carbon dioxide-containing hydro fluoro ether polymers reside in the oxygenating chamber 32, air or oxygen can be bubbled up through the carbon dioxide-containing hydro fluoro ether polymers 34 so as to release gases 36 therefrom. A supply of air or oxygen 38 is connected to the oxygenating chamber 32 so as to allow for the bubbling up of air or oxygen through the carbon dioxide-containing hydro fluoro ether polymers. In this manner, the carbon dioxide molecules are displaced from the polymer chains and replaced with oxygen molecules. The oxygenating chamber 32 is a closed container so as to avoid the release of carbon dioxide, and other gases, into the environment. The gases 36 are released along line 40 into a scrubber 42. The scrubber 42 can be used so as to remove the gaseous byproducts 44. Additionally, the scrubber 42 can be used so as to pass excess oxygen along line 46 back to the oxygenating chamber 32.

In the process of the present invention, some of the hydro fluoro ether polymers will deteriorate in their oxygen-containing capacity over time. Other hydro fluoro ether polymers will be lost during the processing of the sewage. As such, a hydro fluoro ether polymers supply 48 can be connected along line 50 to the oxygenating chamber 32 so as to replenish any lost hydro fluoro ether polymers.

The oxygenated hydro fluoro ether polymers 52 are then passed from the oxygenating chamber 32 back along line 54 to be introduced as an input to the mixing chamber 14. As a result, the process provides a closed loop for the hydro fluoro ether polymers used in the system. Since hydro fluoro ether polymers are relatively expensive, it is desirable to minimize the loss of hydro fluoro ether polymers during the processing.

In FIG. 1, the settling tank 22 has sludge 26 residing above the hydro fluoro ether polymers 24. This sludge 26 can be passed along line 56 to a dewatering system 58. In the dewatering system 58, it is common to use a conveyor belt onto which the dewatered sludges are placed Various other dewatering techniques can also be employed so as to reduce the water content of the sludge to less than 93 percent. After dewatering, the dewatered sludge can be passed along line 60 to the BIOSET (TM) process 62. The BIOSET (TM) process 62 is described in association with FIG. 3 and is presently the subject of U.S. Pat. No. 5,635,069. The product of the BIOSET (TM) process can be passed outwardly therefrom along line 64 as a pathogen-free and vector-free product.

Water resides as the top layer 28 in the settling tank 22. The water from the processed sewage 12 can be passed outwardly of the settling tank 22 along line 66 into the environment. Typically, the water will be discharged into a river or stream or into a tank for treatment. A disinfectant 68, such as chlorine, can be used so as to assure that the water 28 is sufficiently pure for discharge. Similarly, the water 70 resulting from the dewatering system 58 can be passed outwardly along line 72 into the environment 74. Similarly, the water 76 resulting from the BIOSET (TM) process 62 can be discharged along line 78 to the environment.

Figure 2:
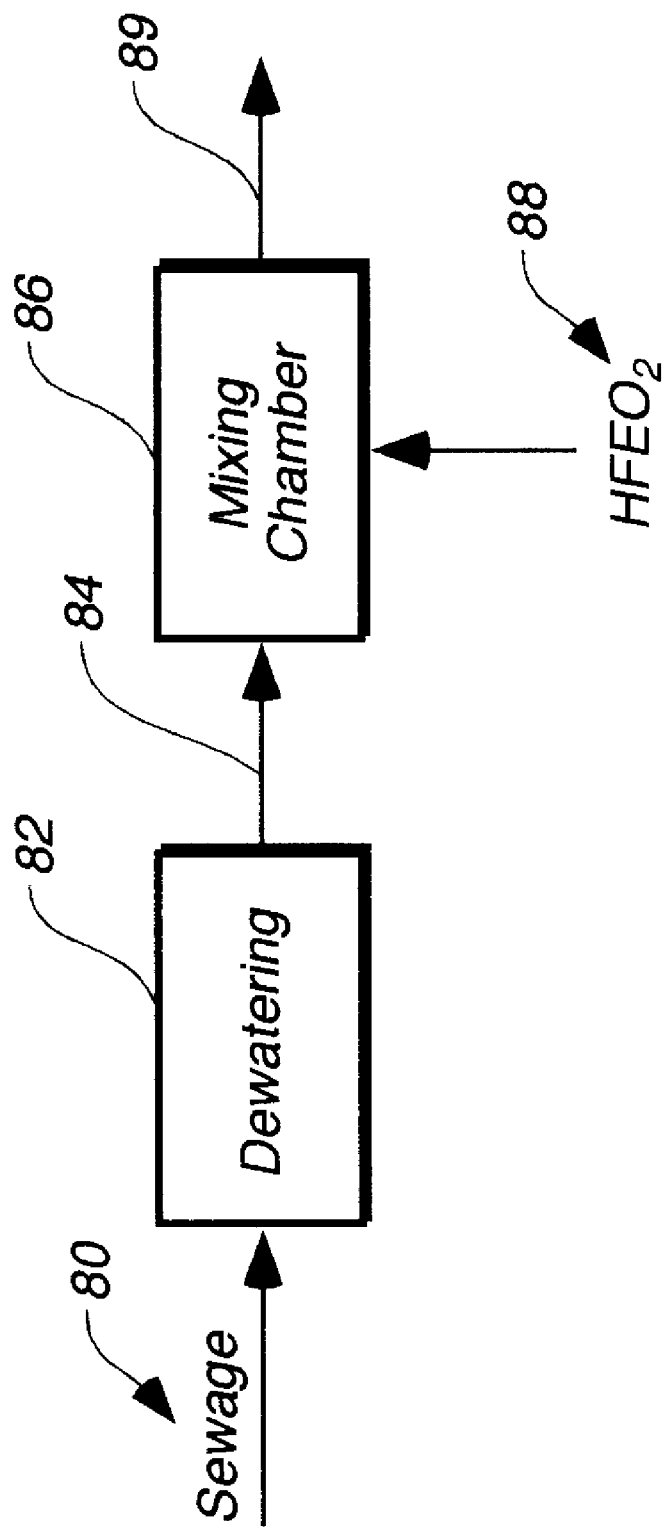
FIG. 2 is a flow diagram showing the step of dewatering the sewage.

FIG. 2 shows a variation on a process illustrated in FIG. 1. Within the concept of the preferred embodiment of the present invention, it may be desirable to dewater the sewage 80 prior to mixing with the hydro fluoro ether polymers. In the dewatering stage, the sewage 80 can be passed along a conveyor so as to separate much of the water from the sewage 80. The dewatering stage 82 should be sufficient such that the dewatered sewage passing therefrom will have a water content of less than 93 percent by weight. The dewatered sewage is passed along line 84 into the mixing chamber 86. In the mixing chamber 86, the dewatered sewage can be appropriately mixed with the hydro fluoro ether polymers 88. Also, as illustrated in FIG. 2, it can be seen that the hydro fluoro ether polymers 88 can be maintained with the dewatered sewage and retained therein for a sufficient time so as to carry out the proper processing of the sewage. The mixing chamber 86 can be the same item as the mixing chamber 14 and the retention chamber 20 (as illustrated in FIG. 1). The mixed hydro fluoro ether polymers and dewatered sewage will pass outwardly of the mixing chamber 86 along line 89 to the settling tank 22 (as illustrated in FIG. 1).

Figure 3:
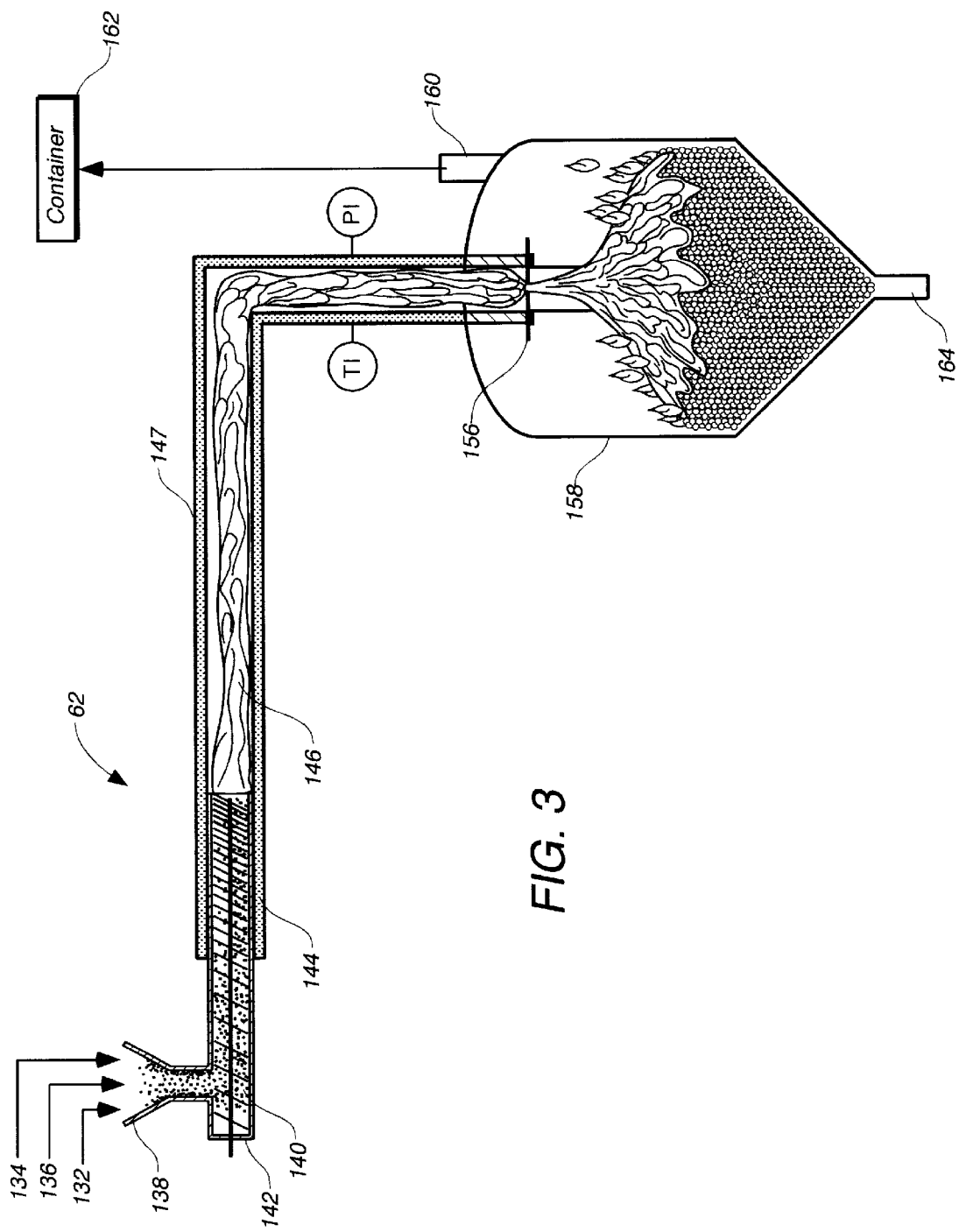
FIG. 3 is a diagrammatic illustration of the BIOSET (TM) process for the treatment of the sludge produced from the sewage.

FIG. 3 is an illustration of the BIOSET (TM) process 62. In the BIOSET (TM) process 62, the dewatered sludge is delivered for processing so as to produce apathogen-free and vector-free end product. In the BIOSET (TM) process 62, the sludge 132, an acid 134, and an oxide-containing chemical 136 are delivered together into a feed hopper 138. The dewatered sludge 132 will have a solids content of greater than 7 percent or a water content of less than 93 percent. It is important for the sludge 132 to have a water content such that the remaining chemicals introduced to the process can properly react with the sludge.

Within the present invention, the preferred acid 134 is sulfamic acid. Sulfamic acid is otherwise known as amidosulfonic acid ($H_3NO_3S$). Sulfamic acid is obtained from chlorosulfonic acid and ammonia or by treating urea with $H_2SO_4$. Typically, sulfamic acid is otherwise used in acid cleaning, in nitrite removal, and in chlorine stabilization for use in swimming pools, cooling towers, and paper mills.

Importantly, within the concept of the present invention, the acid 134 which is used is not limited to sulfamic acid. Various other acids could possibly be used provided a suitable amount of heat could be imparted to the sludge as it passes a later point in the process of the present invention. For example, carbon dioxide could be substituted for the sulfamic acid. The carbon dioxide would form carbonic acid when reacted with the waste sludge. Although experiments have shown that such carbonic acid would not optimally work in the process of the present invention, it would be possible to use such carbonic acid, or other acids, so as to accomplish the purposes of the present invention.

After the sludge 132, the acid 134 and the oxide-containing chemical 136 are added together into the feed hopper 138, the mixture is auger fed into the feed section 140 of a screw conveyor 142. The screw conveyor 142 will rotate so as to transport the mixture of the sludge 132, the acid 134 and the oxide-containing chemical 136 to a feed section. During the transport of the mixture of the sludge 132, the acid 134 and the oxide-containing chemical 136, these materials are mixed together by the screw conveyor.

As used in the present invention, the oxide-containing chemical 136 can be either calcium hydroxide, sodium hydroxide, potaasium hydroxide, lithium hydroxide, calcium oxide, sodium oxide, potassium oxide and lithium oxide. In the preferred embodiment of the present invention, the oxide-containing chemical 136 could be calcium oxide. Other ingredients can be added to the feed section 140, if desired. These other ingredients could be passed along with the oxide-containing chemical 136 or otherwise delivered into the feed section 140. These materials are then transported to the compression zone 144 of the screw conveyor 142. This compression zone 144 serves to increase the pressure of the mixed sludge to the desired value. Specifically, the compression zone 144 should increase the pressure of the mixed sludge to a pressure of greater than 14.7 p.s.i.a. Experimentation has found that the desired effects of the present invention are achieved by pressurizing the mixed sludge to a pressure of between 14.7 p.s.i.a. and 120 p.s.i.a. Importantly, the preferred pressure is greater than 20.7 p.s.i.a. At such pressures, water is retained in the mixture and is not flashed from the system. When the water is flashed by pressures of less than 20.7 p.s.i.a., there is a loss of heat of approximately 1,000 BTU per pound of water. As such, to preserve the optimal heating effects in the process of the present invention, it would be desirable to maintain the pressure on the mixture to a level which would prevent the flashing of the water. Furthermore, the higher pressure keeps any ammonia ($NH_3$) from flashing and retains the ammonia for intimate mixing with the pathogens of the waste sludge. The ammonia byproduct produced from the process of the present invention is an effective chemical for the killing of pathogens in the sludge.

The adding of the oxide-containing chemical 136 and the increasing of pressure through the motive force of the screw conveyor 142 causes an exothermic reaction along the reaction section 146. The combination of calcium oxide and the water within the waste sludge produces calcium hydroxide and liberates 235 kcal/mole of heat. This raises the temperature from ambient to 100° C. in 0.5 seconds. The sulfamic acid 134 then reacts with the calcium hydroxide to form calcium salts. This raises the temperature from 100° C. to 140° C. in less than 1 second.

In the present invention, the oxide-containing chemical 136 can be produced from any source, such as kiln dust or lime dust. The oxide-containing chemical 136 will make up between 5 percent and 50 percent of the waste sludge 132 by weight. The acid 134 that is added, in any form, whereby the weight ratio of acid 134 to the oxide-containing chemical 136 is between 0.33:1 and 1:1. In general, the temperature of the reaction chamber 146 will be between 50° C. and 450° C.

The material which exits the screw conveyor 142 enters pipe 146 having insulation 147 extending therearound. This pipe 146 can contain static mixing elements. The material is continuously mixed as it progresses through the predetermined length of the pipe. The material is continuously under pressure within the pipe 146 so as to prevent a premature flashing of the water within the mixed sludge. The mixed sludge will pass as a flow through the length of the pipe 146. The pipe 146 should be sized so as to have a length and diameter such that the flow of the mixed sludge will continue through the pipe 146 for a period of no less than 15 seconds. The intimate mixing of the ammonia with the pathogens of the mixed sludge at such an elevated temperature and under such an elevated pressure will effectively destroy any pathogens or vectors which would occur within the mixed sludge. The intimate contact of the sludge with the ammonia provides great disinfecting action to the waste sludge. The pressure within the pipe 146 will prevent the ammonia from flashing. Experiments with the present invention have shown that it will reduce pathogens from 2.2 million colonies per gram to less than 10 colonies per gram.

After reacting within the pipe 146, the mixed sludge is flashed across a restricting orifice 156. This restricting orifice 156 can be an opening, a die, or a valve. The orifice 156 is positioned generally adjacent to the end of the pipe 146. The orifice 156 will communicate with a flash chamber 158. As such, the material is delivered under pressure to the orifice 156 and then released into the flash chamber 158. A vapor, including water vapor, $NH_3$, $SO_2$, and $SO_3$, will exit the flash chamber 158 through the vent 160. This vapor can then pass to a container 162. The products of the process can then be sold as valuable byproducts external of the system.

In order to properly remove the water from the sludge, it is important that the flash chamber 158 has an interior pressure of between 0 and 14.7 p.s.i.a. As such, when the mixed sludge passes through the orifice 156, the sludge will be exposed to a lesser pressure. This causes the water and other volatile components of the sludge to be evaporated. As a result, the water content and the temperature of the sludge are appropriately reduced. The heat of vaporization of the flashed material can be passed directly back to the sludge by using heat exchangers, pumps or vapor compressors. After the sludge passes into the flash chamber 158, the resulting sludge will be a sterile decontaminated product which is pathogen-free and vector-free. This product will meet or exceed U.S. E.P.A. standards.

The sterilized sludge then exits the flash chamber 158 through the discharge opening 164.

The geometric configuration of the flash chamber 158 is dependent upon the layout configuration of the facility in which it is used. The flash chamber 158 should have a sufficient diameter and length so as to provide a residence time of the sludge within the chamber of greater than 15 seconds. The insulation 147 is provided so as to eliminate heat loss and to produce an adiabatic reaction.

Tests have been conducted with the configuration of the present invention. The experimental data associated with the process of the present invention is identified in Table I hereinbelow. During these experiments, oxalic acid was included in the experiments. However, it was later determined that the oxalic acid is a temperature depressor and can be a poison. As such, oxalic acid should not be included as part of the process of the present invention Other test results have shown that acids such as $HNO_3$ acid, acetic acid, and vinegar acid do not achieve the necessary reaction so as to significantly increase the temperature of the waste sludge.

TABLE I

| EXP # | CaO gr. | OXALIC OXALIC ACID gr. | SULFAMIC SULFAMIC ACID gr. | WATER cc. | TEMP F. | TIME TO REACH TEMP mins. |
|---|---|---|---|---|---|---|
| 1 | 189 | 75 | 58 | 24 | 300 | 8 |
| 2 | 169 | 75 | 112 | 24 | 607 | 8 |
| 3 | 337 | 153 | 224 | 24 | 619 | 8 |
| 4 | 337 | 308 | 112 | 24 | 580 | 4 |
| 5 | 189 | 75 | 168 | 24 | 400 | 1 |
| 6 | 169 | 75 | 112 | 24 | 667 | 5 |
| 7 | 50 | 40 | 87 | 24 | 250 | 1 |
| 8 | 169 | 0 | 130 | 24 | 840 | 1 |
| 9 | 189 | 130 | 0 | 24 | 370 | 1 |
| 10 | 189 | 0 | 0 | 12 | 213 | 0.2 |
| 11 | 0 | 75 | 0 | 12 | 0 | 1 |
| 12 | 0 | 0 | 50 | 12 | 0 | 1 |
| 13 | 189 | 130 | 0 | 24 | 500 | 3 |
| 14 | 189 | 0 | 130 | 24 | 620 | 1 |
| 15 | 85 | 0 | 85 | 24 | 700 | 1 |
| 16 | 189 | 0 | 130 | 24 | 750 | 1 |
| 17 | 189 | 0 | 130 | 72 | 750 | 1 |
| 18 | 169 | 0 | 189 | 24 | 800 | 1 |

The foregoing and description of the invention is illustrative and explanatory thereof. Various changes in the details of the illustrated construction or of the steps of the described method made within the scope of the appended claims without departing from the true spirit of the invention. The present invention should only be limited by the following claims and their legal equivalents.

We claim:

1. A process for treating sewage containing biological solids comprising:

mixing the sewage with oxygen-containing hydro fluoro ether polymers;

retaining the sewage with the hydro fluoro ether polymers for a desired period of time so as to produce oxygenated sewage and carbon dioxide-containing hydro fluoro ether polymers; and separating the carbon dioxide-containing hydro fluoro ether polymers from the oxygenated sewage.

2. The process of claim 1, further comprising:

separating water from the oxygenated sewage so as to produce a sludge.

3. The process of claim 2, further comprising the steps of:

blending the sludge with an acid, the sludge having a solids content of greater than 7 percent;

mixing an oxide-containing chemical with the blended sludge so as to cause a reaction which elevates a temperature of the sludge, said oxide-containing chemical selected from the group consisting of calcium hydroxide, sodium hydroxide, potassium hydroxide, lithium hydroxide, calcium oxide, sodium oxide, potassium oxide and lithium oxide;

pressurizing the mixed sludge to a pressure of greater than 14.7 p.s.i.a. for a period of time of no less than 15 seconds; and discharging the pressurized mixed sludge.

4. The process of claim 3, said acid being sulfamic acid.

5. The process of claim 3, further comprising:

dewatering the sludge prior to the step of blending, said dewatering causing the sludge to have a water content of less than 93 percent.

6. The process of claim 3, said step of pressurizing comprising:

passing the mixed sludge as a flow through a pipe, said pipe maintaining the mixed sludge at the pressure of greater of than 14.7 p.s.i.a., said pipe having a length such that the flow of the mixed sludge takes longer than 15 seconds to pass through said pipe.

7. The process of claim 3, to said step of discharging comprising:

flashing the pressurized mixed sludge across a restricting orifice; and evaporating a liquid component of the flashed sludge.

8. The process of claim 1, further comprising:
mixing oxygen with the carbon dioxide-containing hydro fluoro ether polymers so as to oxygenate the hydro fluoro ether polymers and to remove carbon dioxide therefrom.

9. The process of claim 8, further comprising:
passing the carbon dioxide to a scrubber so as to separate residual oxygen therefrom; and
introducing said residual oxygen into the hydro fluoro ether polymers.

10. The process of claim 8, further comprising:
mixing the oxygenated hydro fluoro ether polymers with the sewage.

11. The process of claim 8, said step of mixing oxygen comprising:
bubbling air through the carbon dioxide-containing hydro fluoro ether polymers so as to displace carbon dioxide from the hydro fluoro ether polymers and to add oxygen thereto.

12. The process of claim 1, said step of retaining comprising:
retaining the sewage with the hydro fluoro ether polymers at a temperature between 32° and 140° F.

13. The process of claim 1, said step of mixing comprising:
dewatering the sewage prior to mixing such that the dewatered sewage has a water content of less than 93 percent by weight.

14. The process of claim 1, said steps of mixing and retaining being carried out simultaneously in a closed vessel.

15. The process of claim 1, said hydro fluoro ether polymers comprising an emulsion containing perflouro-bis-chlorobutyl ether.

16. The process of claim 1, said hydro fluoro ether polymers comprising an aqueous emulsion of a saturated $C_8$ to $C_{12}$ perfluorocarbon ether hydride selected from the group consisting of: hydroperfluoroaliphatic ether, a hydroperfluoroaliphatic ether substituted with a perfluoroalicyclic group and a hydroperfluoroalicycloaliphatic ether and mixtures thereof, wherein said aliphatic ether has a straight-chain or a branched-chain of carbon atoms, water and surfactant.

17. A process of treating sewage containing biological solids comprising:
mixing the sewage with oxygen-containing hydro fluoro ether polymers in a closed container for a desired period of time so as to oxygenate the sewage; and
separating the hydro fluoro ether polymers from the oxygenated sewage.

18. The process of claim 17, further comprising:
treating the oxygenated sewage so as to remove pathogens therefrom.

19. The process of claim 17, said step of separating comprising:
separating the oxygenated sewage into water and a sludge; and
treating the sludge so as to remove pathogens therefrom.

20. The process of claim 19, further comprising:
oxygenating the separated hydro fluoro ether polymers by passing air or oxygen in intimate contact with the separated hydro fluoro ether polymers.

* * * * *